United States Patent [19]

Forsberg

[11] Patent Number: 4,666,654
[45] Date of Patent: May 19, 1987

[54] BOILING WATER NEUTRONIC REACTOR INCORPORATING A PROCESS INHERENT SAFETY DESIGN

[75] Inventor: Charles W. Forsberg, Kingston, Tenn.

[73] Assignee: The United States of America as represented by the United States Department of Energy, Washington, D.C.

[21] Appl. No.: 702,752

[22] Filed: Feb. 19, 1985

[51] Int. Cl.$^4$ ................................................ G21C 7/06
[52] U.S. Cl. ..................................... 376/219; 376/282; 376/247
[58] Field of Search ............... 376/245, 247, 352, 336, 376/282, 219

[56] References Cited

U.S. PATENT DOCUMENTS

| 4,204,909 | 5/1980 | Giuggio et al. | 376/336 |
| 4,363,780 | 12/1982 | Hannerz | 376/282 |
| 4,483,192 | 11/1984 | Wachter | 376/245 |
| 4,526,742 | 7/1985 | Hannerz | 376/282 |

FOREIGN PATENT DOCUMENTS 0008288 1/1979 Japan ..................... 376/352

OTHER PUBLICATIONS

K. Hannerz, "Applying Pius to Power Generation: The Secure-PLWR", Power Plant Design, 12/83, pp. 41-46.
Asea-Atom-Always in the Forefront, "The Ultimate in BWR Design Simplicity-The Key to Improvement Performance", Nuclear News, Nov. 1983, pp. 30-31.
L. Wann, "Congress to Bet Millions 'Meltdown Proof' Reactors Can Save Nuclear Industry", Chattanooga Times, Feb. 1984.
"PIUS Gets Cautious But Hopeful Reception at NRC", Nucleonics Week, Oct. 13, 1983, p. 3.
K. Hannerz, "Towards Intrinsically Safe Light Water Reactors", Institute for Energy Analysis, Oak Ridge Associated Universities ORAU/IEA-31-2(M)-Rev., Research Memorandum, Jul. 1983.

Primary Examiner—Nicholas P. Godici
Assistant Examiner—Karen Skillman
Attorney, Agent, or Firm—Stephen D. Hamel; Judson R. Hightower

[57] ABSTRACT

A boiling-water reactor core is positioned within a prestressed concrete reactor vessel of a size which will hold a supply of coolant water sufficient to submerge and cool the reactor core by boiling for a period of at least one week after shutdown. Separate volumes of hot, clean (non-borated) water for cooling during normal operation and cool highly borated water for emergency cooling and reactor shutdown are separated by an insulated wall during normal reactor operation with contact between the two water volumes being maintained at interfaces near the top and bottom ends of the reactor vessel. Means are provided for balancing the pressure of the two volumes at the lower interface zone during normal operation to prevent entry of the cool borated water into the reactor core region, for detecting the onset of excessive power to coolant flow conditions in the reactor core and for detecting low water levels of reactor coolant. Cool borated water is permitted to flow into the reactor core when low reactor coolant levels or excessive power to coolant flow conditions are encountered.

6 Claims, 10 Drawing Figures

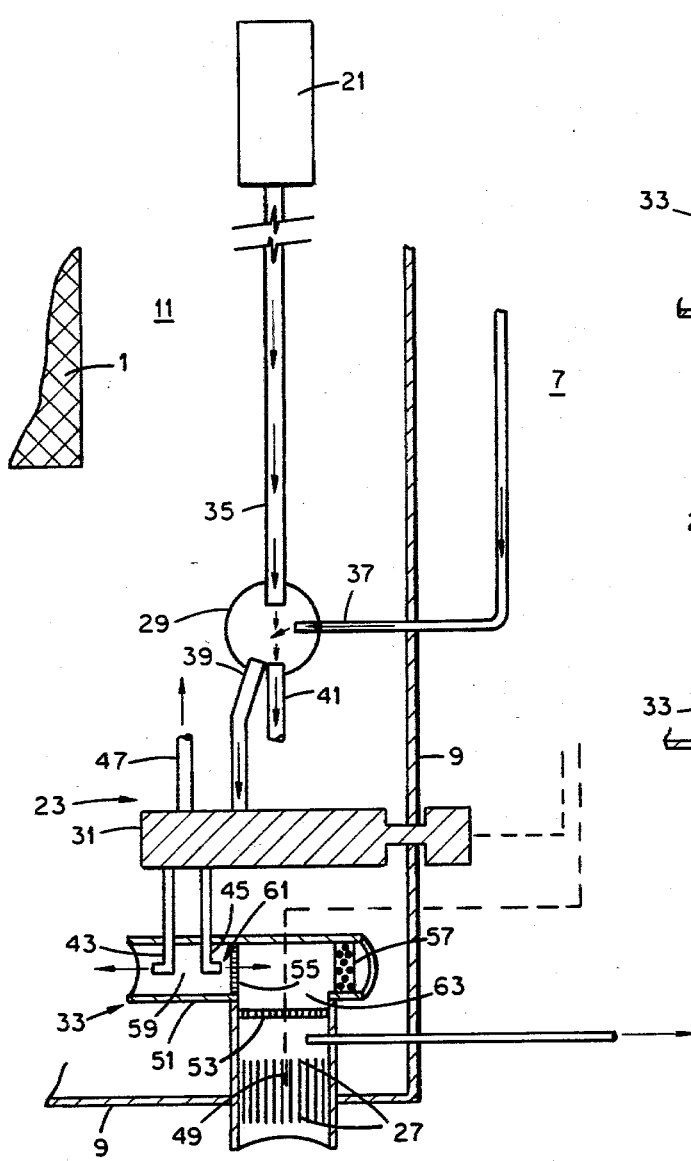
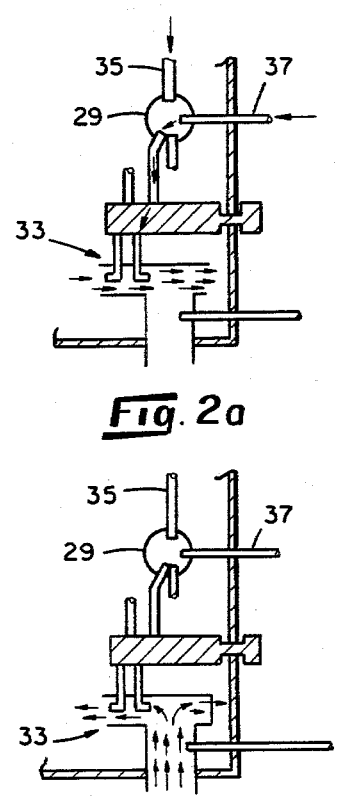
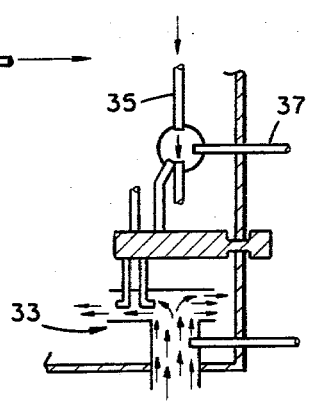
Fig. 2
Fig. 2a
Fig. 2b
Fig. 2c

BOILING WATER NEUTRONIC REACTOR INCORPORATING A PROCESS INHERENT SAFETY DESIGN

It was made in the course of or under Contract W-7405-ENG-26 between Union Carbide Corporation and the U.S. Department of Energy.

BACKGROUND OF THE INVENTION

The invention relates generally to boiling water reactors and more particularly to a boiling water reactor design which effectively eliminates the possibility of reactor core meltdown.

Efforts to provide a nuclear power reactor with greatly enhanced safety features have led to a pressurized-water reactor concept which is designated the PIUS/pressurized-water reactor, where PIUS refers to a set of design criteria and is an acronym for Process Inherent Ultimate Safety. The design criteria for the PIUS reactor are safe reactor shutdown and afterheat cooling for a period in excess of one week under various adverse conditions where the shutdown and emergency core cooling systems of conventional pressurized-water reactors could be rendered inoperative. In practice, such design criteria imply that there will be no electrical or moving mechanical components such as valves, pumps, etc. required for safe reactor shutdown and emergency core cooling since such components are subject to misoperation, malfunction or sabotage. Such a design has the potential advantages of minimizing public concern for reactor safety, reducing siting restrictions, lowering licensing requirements and shortening construction schedules.

Design features of PIUS reactors include a large prestressed concrete reactor vessel (PCRV) which contains the reactor, pumps and steam generators in the case of a pressurized-water reactor. All openings are at the top of the PCRV which is sized to hold an inventory of water sufficient to cool the reactor by boiling upon shutdown for a period exceeding one week, thus obviating the need for a conventional emergency core cooling system with external pumps, piping systems and makeup water. Contained inside the PCRV are separate volumes of (1) water coolant, which has a low boron content for reactor reactivity control, for cooling the reactor during normal operation and (2) emergency water coolant which is highly borated to shut down the reactor and cool it if it enters the core. In effect, a pressurized-water reactor is submerged in a large pool of borated water which flows into the core, shutting it down and providing afterheat cooling, when conditions permit such entry. All major safety-related components are within the PCRV and protected by the PCRV which, because of its semiunderground location, its design with all major openings at or near the top of the vessel, its strength and its mass, is capable of withstanding attack by conventional munitions and severe natural disturbances without loss of coolant.

The two water volumes are in direct contact at two or more points with no valves or other obstructions to prevent flow of the highly borated water into the reactor core under emergency conditions. During normal operation, the hot low-density, low-boron-content normal cooling water is maintained above the cool, high-density, highly borated emergency coolant water at each interface in a naturally stable stratification which minimizes mixing of the two volumes. In addition, a pressure balance is maintained at the upper and lower interface through: (1) the reactor core and riser; (2) the cool borated water; and (3) the steam generators and pumps. Pressure drops across the steam generators and pumps are compensated for through the use of variable-speed recirculative pumps with pump speed being controlled by means of temperature sensors which monitor the interface between the hot and cold water volumes. Failure or misoperation of the recirculative pumps, steam generator feedpump failure, boiling in the core or other core thermal disturbances or flow disruptions create conditions under which a water circulation pattern is established whereby cool highly borated water enters the core to shut it down and continues to circulate through the core to remove afterheat due to thermal convection and boiling without the need for pump operation.

Although the PIUS design concept has been heretofore limited to pressurized-water reactors, application of that concept to boiling-water reactors is desirable for the same safety-related reasons advanced in connection with pressurized-water reactors. However, such application is complicated in boiling-water reactors by the existance of significant variations in system pressure and component pressure drops with variations in reactor power. These variations make the hydrostatic balancing approach as used in the PIUS pressurized-water reactors unusable in a PIUS boiling-water reactor.

It is, accordingly, a general object of the invention to provide a PIUS boiling-water reactor design.

Another object of the invention is to provide any accident situation a means for ensuring circulation of cool highly borated water through a boiling-water reactor core in a reactor incorporating PIUS design principles.

Other objects and benefits of the invention will become apparent to those skilled in the art upon examination of the following detailed description of a preferred embodiment of the invention and the accompanying drawings.

SUMMARY OF THE INVENTION

A PIUS boiling-water reactor is provided wherein a boiling-water reactor core is positioned within a large prestressed concrete reactor vessel of a size which will hold a supply of coolant water sufficient to submerge and cool the reactor core by boiling for a period of one week after shutdown. The size of the PCRV required to store sufficient cool borated water allows the option of a natural circulation reactor. This simplifies plant design. Natural circulation reactors are normally not used because of size restrictions imposed by conventional steel pressure vessels. The option does exist to use conventional recirculation pumps with a PIUS boiling-water reactor. Separate volumes of hot, clean (non-borated) water for cooling during normal operation and cool highly borated water for emergency cooling and reactor shutdown are separated by an insulated wall during normal operation. Although a fluidic valve assembly maintains separation of the two water volumes near the bottom of the reactor, the water volumes are in direct contact through naturally stable interface zones in the valve assembly and near the top of the pressure vessel below the steam separators. A Fluidic In-Vessel Emergency Core Cooling System (FIVES) and a Critical Heat Flux Scram System (CHEFSS) ensure (1) sufficient water in the reactor core and (2) the avoidance of an excessive power-to-coolant flow mismatch condition in the core. The FIVES consists of a water pump positioned high above the reactor core within the reactor downcomer which is designed to provide a nearly constant pressure increase with some flow variation and a fluidic valve which maintains an interface zone between the hot clean and cool borated water volumes located below the fluidic valve without any moving mechanical parts. A direct unobstructed path is maintained between the two water volumes even when the valve is closed. If the flow from the FIVES pump fails due to low reactor water (insufficient water) or other reasons or is diminished, the cool borated water automatically flows into the reactor core. The FIVES water pump provides both a source of high pressure water to the fluidic valve and acts to signal the fluidic valve if there is a low water level in the reactor.

According to one embodiment, the CHEFSS is a special electrical fuse which "blows" upon an excessive power/coolant flow rate mismatch sufficient to cause excessive core heating. Power to the FIVES pump is fed through CHEFSS. Interruption of this power will shut down the FIVES pump, thereby opening the fluidic valve and flooding the reactor core with cool borated water. CHEFSS consists of one or more annular sensor fuel pins with a power line extending therethrough. If more than one pin is used, the power line is run in series through the pins so that burnout of the power line in any one of the fuel pins will disrupt power flow to the FIVES pump. Another embodiment of the CHEFSS utilizes a fluidic sensor fuel pin and signal converter to determine the onset of excessive power levels in the reactor core. The sensor fuel pin is designed to reach a critical heat flux before the conventional pins reach the critical heat flux or any other limiting operational parameter. A critical heat flux in the sensor fuel pin affects the flow from the sensor fuel pin to the signal converter resulting in a signal output from the converter to the fluidic valve which opens the valve and permits cool borated water to enter the reactor core.

BRIEF DESCRIPTION OF THE DRAWINGS

FIG. 2 is a schematic drawing of the fluidic valve suitable for use in the reactor of FIG. 1;

FIG. 2a illustrates operation of the valve of FIG. 2 in a closed position corresponding to normal reactor operation;

FIG. 2b illustrates the operation of the valve of FIG. 2 in an open position due to a lack of high-pressure flow from the FIVES pump and sensor;

FIG. 2c illustrates the operation of the valve of FIG. 2 in an open position due to insufficient high pressure flow from the CHEFSS sensor;

DESCRIPTION OF THE PREFERRED EMBODIMENT

Figure 1:
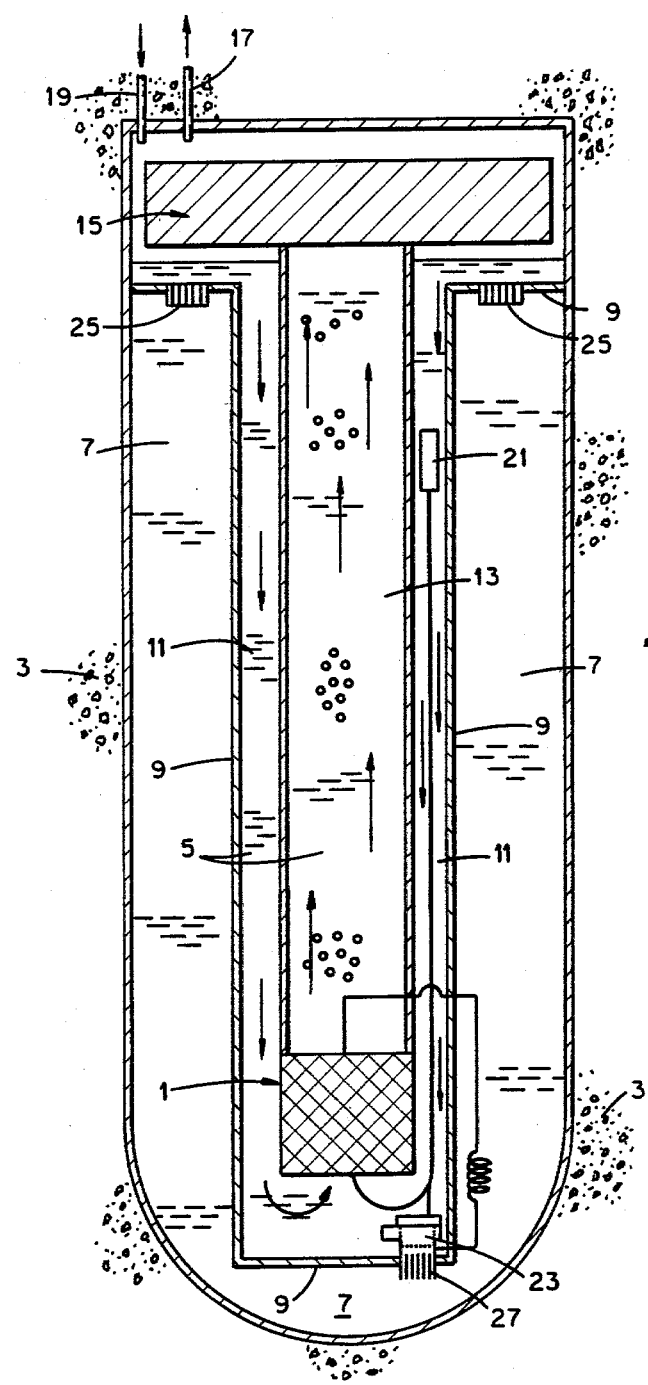
FIG. 1 is a schematic drawing of a PIUS boiling-water reactor.

Referring now to the drawings, initially to FIG. 1 where a boiling-water PIUS reactor is schematically illustrated, a reactor core 1 is shown positioned near the bottom of a large, upright prestressed concrete reactor vessel (PCRV) 3 which is preferably half or more buried to minimize its exposure. As shown, there are no penetrations in the PCRV except near its top end so that the possibility of coolant leakage is minimized. Two volumes of water substantially fill the PCRV, hot reactor coolant 5 which circulates through the reactor during normal operation and cool borated water 7 which shuts the reactor down and provides extended cooling in an emergency. The total inventory of the cool borated water is sufficient to cool the reactor by boiling upon shutdown for a period exceeding one week; thus no conventional emergency core cooling system using pumps, external piping, conventional valves, etc., is required. Insulated walls 9 separate the two volumes of water which are essentially at the same pressure at corresponding vertical positions on opposite sides of the walls, thereby obviating the need for boundaries which are capable of supporting large pressure differentials.

During normal operation, reactor coolant 5 passes downwardly through downcomer 11, upward through reactor core 1, where a portion of the coolant is boiled, and then upward through riser 13 in the form of a liquid/vapor mixture. Steam separated from the mixture in steam separator 15 passes from the PCRV through a suitable conduit 17 to a conventional steam turbine which drives an electrical generator. Feedwater in the form of condensate from the steam turbine and makeup water, if needed, are returned to the PCRV through a suitable conduit 19. Conduits 17 and 19 pass through the upper end of the PCRV so that any rupture in those members would not result in substantial losses of water from the PCRV.

Additional features shown in FIG. 1, which will be described below in greater detail, include water pump 21, which is part of a unique fluidic in-vessel emergency core cooling system and a fluidic valve assembly 23 which maintains separation between water volumes 5 and 7 during normal operation while permitting entry of cool borated water into the core 1 under emergency conditions. Interface regions 25 near the top of the PCRV and 27 below the fluidic valve assembly are also shown. The two water volumes 5 and 7 are maintained in contact in these regions with little or no mixing during normal reactor operation.

Turning now to FIG. 2, the fluidic valve assembly 23 of the fluidic in vessel emergency core cooling system is illustrated in greater detail. This particular layout is used with the fluidic version of CHEFSS. As shown, the fluidic valve assembly includes a fluidic amplifier 29, a three-way electromechanical control valve 31 and a fluidic valve 33. Fluidic amplifier 29 is powered by high pressure water which flows through conduit 35 from pump 21 located high in downcomer 11 and also is responsive to a high pressure or a high flow signal through conduit 37 from the fluidic critical heat flux scram system to be described below in reference to FIGS. 3-4. The output from fluidic amplifier 29 is a high-pressure water flow through conduit 39 to the electromechanical control valve 31 during normal operation when high pressure water is received from pump 21 and high pressure water is supplied through conduit 37 from the fluidic critical heat flux scram system. In effect, the fluidic amplifier acts as a fluidic off/on valve which provides fluidic power to the rest of the fluidic valve assembly only if the reactor is experiencing satisfactory operating conditions. Water from pump 21 is converted into a high-velocity, high momentum nozzle at the end of conduit 35. Pressurized water from the critical heat flux scram system is likewise converted into a high-velocity, high-momentum stream when sufficient water is supplied from that system. The water from the CHEFSS system impacts upon the water stream from pump 21 diverting the latter into channel 39 leading to control valve 31. Water passing through channel 39 slows down and increases in pressure, thereby creating a high-pressure water source for the control valve. Where no water enters the fluidic amplifier through conduit 37, the stream entering from conduit 35 is not diverted and simply exits the amplifier through conduit 41 which empties into the reactor core downcomer.

Fluidic valve 33, which resembles an open pipe connecting the two water volumes 5 and 7, has no physical parts such as a gate to prevent flow as is the case with conventional mechanical valves. It consists rather of two opposed back-to-back hydraulic jet pumps 43 and 45 which act to maintain the interface between the two volumes of water within the interface zone 27. The pumping action provided by the fluidic valve is controlled by control valve 31 which is a three-way mechanical valve for directing high pressure water to one of the two opposing jet pumps 43 and 45 or dumping it through conduit 47 to the reactor core downcomer. Temperature and/or motion and/or chemical sensors 49 detect the interface location between the two volumes of water and, based on the level of the interface, the control valve 31 either directs water to one of jet pumps 43, 45 to adjust the interface level or dumps water to the downcomer. Failure of valve 31 opens the fluidic valve 33 which allows borated water into the reactor core, shutting it down. Valve malfunction may either allow borated water of water volume 7 through the valve to the reactor core or push the reactor water coolant of volume 5 through interface 27 into the borated water volume thereby permitting borated water to flow upward through interface zones 25 at the top of the PCRV and then down through downcomer 11 to the reactor core. Once the borated water enters the reactor core, the reactor is shut down irregardless of how this circulation of cool borated water takes place although the more likely direction circulation mode is for the cool borated water to flow downward about the outside and enter the core region through interface zone 27. Only continual operation with high pressure water from pump 21 and from the critical flux scram system maintains the valve in a dynamically closed condition. During most operations, borated water near the bottom of the reactor will be at a high pressure than that of the reactor coolant due to the greater density of the cool water so that it will enter the reactor core through interface 27 if the fluidic valve is not dynamically opposing such entry. For typical designs, there is approximately a seven psi pressure difference between the reactor coolant and the borated water at the interface region 27 based on density differences of the water volumes and the depth of the water in the PCRV.

The fluidic valve 33 shown in FIG. 2 consists of a T-shaped pipe 51 with three flow resistances 53, 55 and 57 in the form of pipe restrictions (but not blockages) such as wire mesh or small diameter pipe sections. The flow resistance 53 in the vertical pipe section minimizes turbulence between the interface zone 27 and the remainder of the valve. The horizontal section of the pipe has two flow resistances 55 and 57 in alignment with the jet pumps. When jet pump 45 discharges toward flow resistances 55 and 57, three zones with different water pressures are created. Water pressure in a first zone 59 near the entrance to the jet pump is that of the reactor coolant at the same vertical level. A second zone 61 between the jet pump and flow resistance 55 is at a higher pressure due to the jet pump. The third zone 63 between flow resistances 55 and 57 has a pressure equal to that of the cool borated water at the equivalent level. This pressure is higher than that of the reactor coolant but less than that at the exit of jet pump 45. Water from the jet pump in zone 63 flows through resistance 57 where it returns to hot coolant pressure. If the jet pump is operated with higher flows, the pressures in zones 61 and 63 increase proportionately. Increases or decreases in pressure in zone 63 may be needed to maintain the interface between the reactor coolant and cool borated water within interface zone 27 by balancing the pressures of the hot coolant and cool borated water at the interface or by creating a pressure imbalance to move the interface as necessary to keep it within the zone. When jet 45 is not operating, the cool borated water will flow into the reactor through flow resistance 55 and 57 with most of the flow through flow resistance 55 because that path offers the least resistance.

FIGS. 2a, 2b and 2c illustrate operation of the fluidic valve assembly of FIG. 2 during normal reactor operation (FIG. 2a), low reactor water conditions (FIG. 2b) and a power/coolant flow rate mismatch (FIG. 2c). As shown in FIG. 2a, water from pump 21 enters the fluidic amplifier 29 through conduit 35 and is deflected by the discharge of fluid from conduit 37. The deflected water enters and flows through conduit 39 to control valve 31 and then discharges from jet 45 to maintain flow to the right through the horizontal pipe section of fluidic valve 33. This represents a "valve closed" condition which prevents entry of the cool borated water into the reactor core inlet. FIG. 2b illustrates the low reactor water situation where cool borated water is permitted to enter through fluidic valve 33. This condition would occur where, for example, the water level in the reactor downcomer falls below the level of pump 21. If that happens, pump 21 cannot pump water through conduit 35 to fluidic amplifier 29 and jet pump 45 cannot be operated to offset the higher pressure of cool borated water at interface zone 27. The higher pressure cool borated water will then enter the reactor core inlet through fluidic valve 33. FIG. 2c illustrates the operation of the fluidic valve assembly in a situation where the power level in the reactor core exceeds core cooling capacity. This is detected by CHEFSS when the critical heat flux is exceeded on the special sensor fuel pin before normal pins overheat or are damaged. This reduces or stops the flow entering the fluidic amplifier through conduit 37, thereby stopping flow through conduit 39. With the flow through conduit 39 stopped, jet pump 45 stops and fluidic valve 33 opens, thereby permitting cool borated water to enter the reactor.

Figure 3:
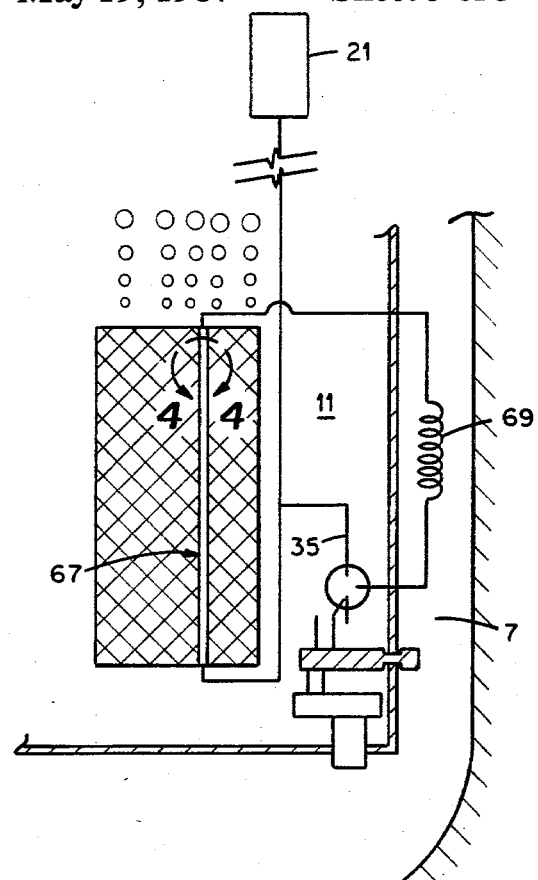
FIG. 3 is a schematic drawing of a reactor core utilizing a CHEFSS fluidic sensor fuel pin to determine when excess power levels compared to coolant flowrates exist in the reactor core.
Figure 4:
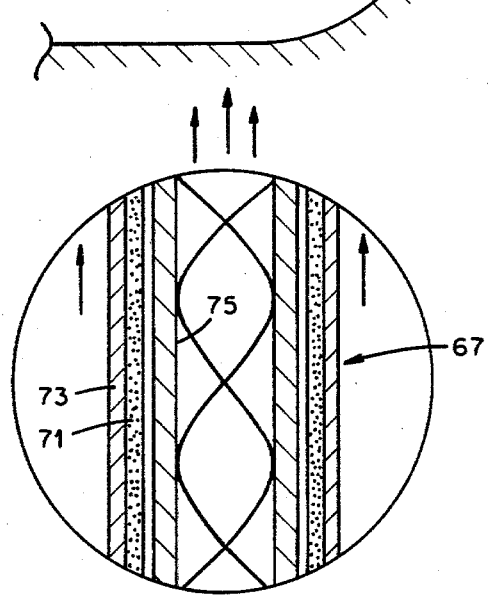
FIG. 4 is an enlarged view of the area bounded by lines 4—4 in FIG. 3 showing details of the fluidic sensor fuel pin.

One embodiment of a critical heat flux scram system consisting of a sensor fuel pin 67 and signal converter 69 is illustrated in FIGS. 3 and 4. The sensor fuel element is tubular in shape with its outside surface being cooled by reactor coolant which is flowing normally through the reactor core while its inside surface is cooled by reactor coolant from pump 21. The sensor fuel pin is designed to reach a critical heat flux before any conventional fuel pin in the reactor does so or before any pin reaches any other operating limit. This can be achieved by higher fuel loadings, higher enrichment, special surfaces or modified hydraulic conditions associated with the sensor fuel pin. If too much heat is generated in a fuel pin of a boiling-water reactor (or too little heat removed) the fuel pin will exceed the critical heat flux which is a condition characterized by formation of a steam layer on the pin surface which insulates the pin, thereby reducing heat transfer from the pin. This condition will cause the temperature of the fuel pin to increase and will eventually cause clad and fuel pin failure. The sensor fuel pin 67 is designed to reach a critical heat flux before the conventional pins so that action may be taken to prevent the conventional pins from reaching their critical heat flux or any other operational limit. Typically, the sensor will be an annular sensor fuel pin because of ease of fabrication and robust design characteristics; however, the "sensor fuel element" can be built in any geometry with two sides.

Heat generated within the cermet fuel mix 71 of the tubular sensor fuel pin is transferred to the reactor coolant flowing outside of thin cladding 73 and inside of thick cladding 75 as shown in FIG. 4. The relative heat flow to the outside is greater since the thin cladding 73 offers less thermal resistance. If the critical heat flux on the outside or reactor coolant side is exceeded, the resistance to heat transfer to the inside will be relatively less and much of the heat will flow to the water flowing through the inside of the sensor fuel pin. Heat flow to the outside will be limited because of the insulating layer of steam which is developed when the critical flux on that surface is exceeded. The temperature of the fuel material 71 will increase because of the reduction of heat transfer to the outside and this increased temperature will cause an increase of heat transfer through the inside cladding 75 to coolant pumped to the sensor fuel pin by pump 21. This increase in heat transfer to the water from pump 21 causes several changes in the water exiting the sensor to the signal converter 69. These changes include: (1) a re-distribution of pressure drop along the sensor fuel element and signal converter, (2) an increase in the steam quality, (3) a decrease in total mass flow through the sensor fuel element, (4) a decrease in liquid mass flow and (5) increased steam flow. One or more of these phenomena can be sensed by the signal converter to produce a low-pressure, low-flow signal to the fluidic amplifier 29 of the fluidic valve assembly; thereby causing cool borated water to enter the reactor through fluidic valve 33 as illustrated in FIG. 2c. The signal converter can be a simple heat exchanger in the cool, borated water zone where the steam/water flow from CHEFSS is condensed to a liquid before going to 29. The boiling process within the sensor fuel pin when the critical heat flux occurs increases the pressure drop through the tubing. Since water pump 21 provides a constant pressure increase, an increased pressure drop due to boiling is compensated by reduction of liquid flow to amplifier 29 through line 37. Reduced water flow in line 37 allows fluidic valve 33 to open.

Figure 5:
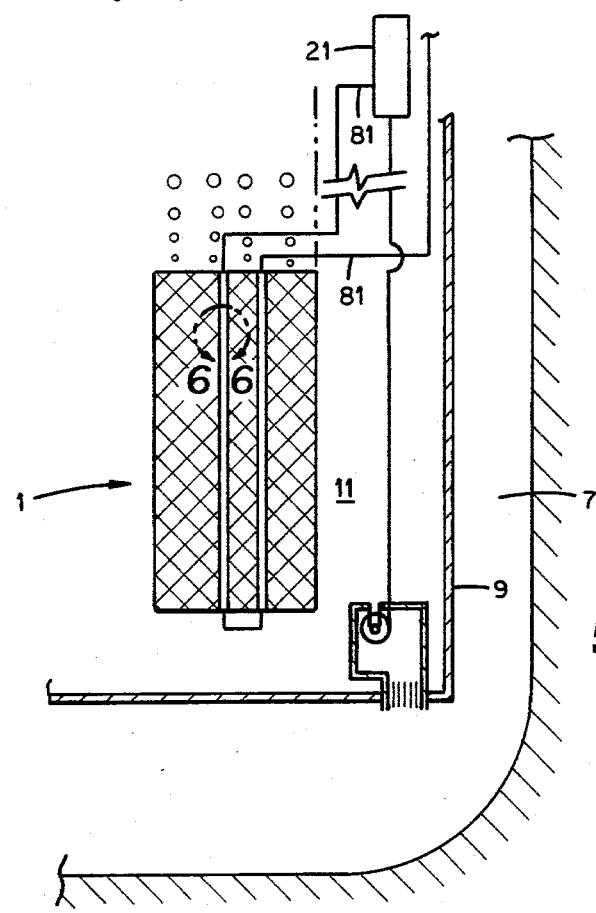
FIG. 5 is a schematic drawing of a reactor core utilizing a CHEFSS electric sensor fuel pin to determine when excess power levels compared to coolant flowrates exist in the reactor core.
Figure 6:
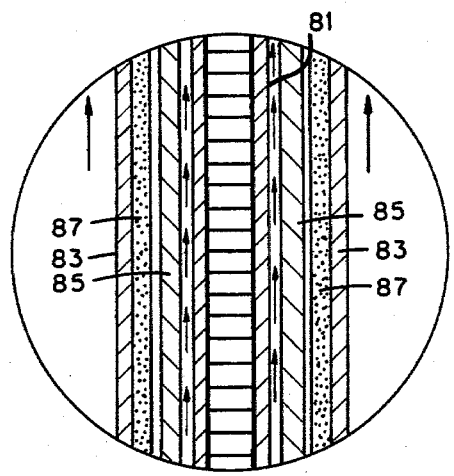
FIG. 6 is an enlarged view of the area bounded by lines 6—6 in FIG. 5 showing details of the electric sensor fuel pin.

FIGS. 5 and 6 illustrate an alternative embodiment of the fluidic in-vessel emergency core cooling system with a critical heat flux sensor system wherein the power line 81 to pump 21 is passed along the center of one or more annular sensor fuel pins in a series arrangement. Reactor coolant flows on both sides of the sensor fuel pin which is provided with thin cladding 83, thick cladding 85 and fuel material 87 much in the same manner as the sensor fuel element of FIGS. 3 and 4. If the outside of the sensor fuel element exceeds the critical heat flux, the resultant increase in temperature of the fuel material and internal surface will cause the power line to burn out. Burnout of power line 81 causes pump 21 to stop which causes the fluidic valve 33 (see FIG. 2b) to open and cool borated water to enter the core. In this embodiment, amplifier 29 is unnecessary since CHEFSS cuts power to the FIVES pump rather than cutting pressurized water from water pump 21 to the fluidic valve as shown in FIG. 2.

Figure 7:
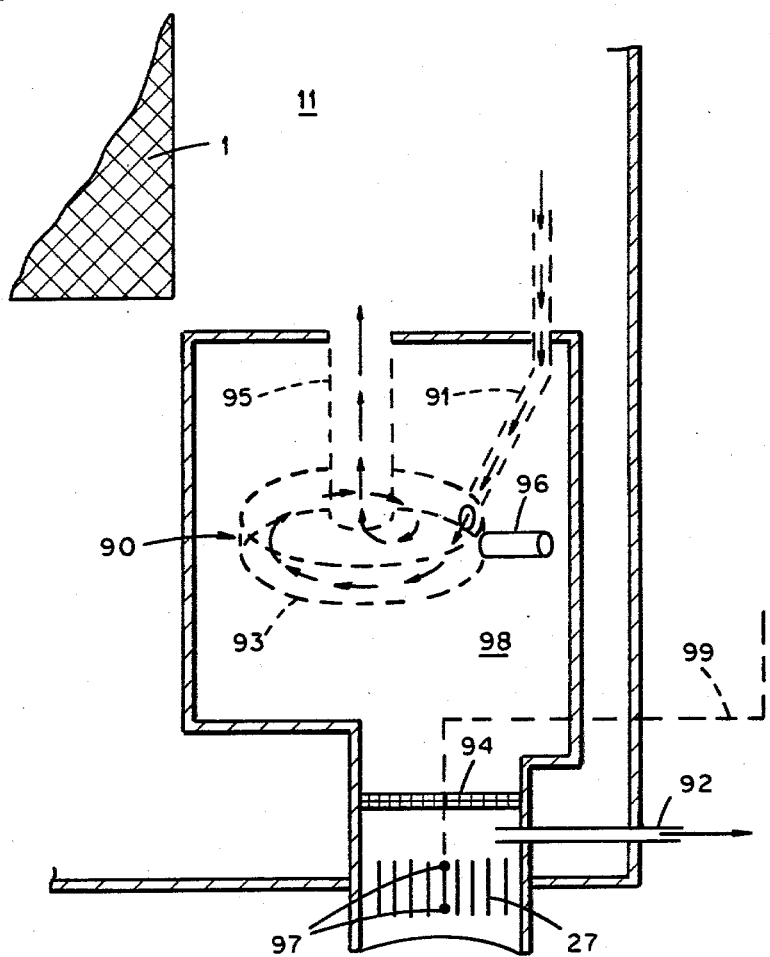
FIG. 7 is a schematic drawing of a vortex fluidic valve assembly suitable for use with the critical heat flux sensor system of FIGS. 5 and 6.

FIG. 7 schematically illustrates a vortex fluidic valve assembly for use with the critical heat flux sensor system of FIGS. 5 and 6. The vortex fluidic valve 90 is essentially a conventional vortex fluidic amplifier operated as a valve. As shown, incoming water from pump 21 is injected tangentially at high velocities from conduit 91 into a flat cylindrical housing 93 which causes the water to move in a circular path within the housing. The rotating water flows in a vortex fashion from the higher pressure periphery of the housing toward the lower pressure center region where it discharges through conduit 95 to the reactor core downcomer 11. Conduit 96 opens to plenum 98 in order to maintain the pressure in the plenum equal to the peripheral pressure within the housing 93. No discharge occurs through conduit 96 unless the peripheral pressure in housing 93 exceeds the pressure in plenum 98 which corresponds to that of the cool borated water at the same vertical level. By adjusting the input from pump 21, the peripheral and discharge pressures of the water can be made to match the pressures of the two water zones. Any suitable restriction such as a screen 94 minimizes mixing in the interface due to turbulence in the plenum 98. A water cleanup exit line 92 is also provided immediately above the interface zone to minimize mixing of borated water with reactor coolant during normal operation.

Below the fluidic valve is a hot/cold interface zone 27 with hot reactor coolant on top and cool, borated water on the bottom. The density difference between the two liquids contributes to the stability of this interface. Temperature sensors 97 connected by way of instrument line 99 are used to determine the location of the interface, thereby permitting adjustment of the output of pump 21 to raise or lower pressure in housing 98 and thereby cause the interface to lower or raise as necessary to keep it within the zone 27. Failure of pump 21 will drop the pressure in housing 93, thereby permitting flow of cool borated water into plenum 98, through conduit 96 into housing 93 and through conduit 95 into the reactor inlet plenum where it mixes with reactor coolant to shut down and cool the reactor.

The foregoing description of a preferred embodiment of the invention has been presented for purposes of illustration and is not intended to be exhaustive or to limit the invention to the precise form disclosed. It was chosen and described in order to best explain the principles of the invention and their practical application to thereby enable others skilled in the art to best utilize the invention in various embodiments and with various modifications. It is intended that the scope of the invention be defined by the claims appended hereto.

I claim:

1. A boiling-water nuclear reactor incorporating an inherent safety design comprising:
   (a) a boiling-water reactor core;
   (b) an elongated, vertically-oriented, generally cylindrical, prestressed concrete reactor vessel having upper and lower ends, said reactore core being positioned within said reactor vessel near the lower end thereof;
   (c) a first volume of clean reactor coolant water which circulates through said reactor core during normal reactor operation;
   (d) a second volume of cool borated water which is separated from said first volume of reactor coolant during normal operation of said reactor, said first and second volumes of water extending coaxially along substantially the entire vertical length of said reactor vessel;
   (e) upper and lower interface zones, wherein said first and second volumes of water are maintained in non-mixing contact during normal reactor operation, located near the upper and lower ends of said reactor vessel;
   (f) means for balancing the pressure of said first and second water volumes at said lower interface zone to prevent passage of cool borated water through said lower interface zone comprising:
      (i) means for supplying clean reactor coolant at high pressure;
      (ii) a fluidic amplifier for receiving reactor coolant from said means for supplying clean reactor coolant;
      (iii) a control valve for receiving reactor coolant from said fluidic amplifier; and
      (iv) a fluidic valve actuated by reactor coolant from said control valve, said fluidic valve being connected to said lower interface zone to selectively adjust the pressure of said clean reactor coolant adjacent said lower interface to prevent flow of cool borated water through said lower interface;
   (g) means for detecting excessive power to coolant flowrate conditions in the reactor core by the onset of a critical heat flux condition in sensors containing fuel and permitting passage of said cool borated water through said lower interface zone into said reactor core when such an excess power to coolant condition is approached; and
   (h) means for detecting low water levels of reactor coolant and permitting passage of said borated water through said lower interface zone into said reactor core when the level of said reactor coolant is low.

2. The reactor of claim 1 wherein said means for supplying clean reactor coolant comprises a high pressure pump having an inlet, said inlet being disposed in said first water volume at a point near the upper end of said reactor vessel whereby a shortage of reactor coolant prevents reactor coolant from entering said inlet and said high pressure pump from supplying reactor coolant to said fluidic amplifier.

3. The reactor of claim 1 wherein said fluidic valve comprises a tubular T-shaped member having a vertical section in fluid communication with said lower interface and a horizontal section which intersects with said vertical section having first and second ends open to said clean reactor coolant, means for providing water flow resistance within said vertical section near its intersection with said horizontal section and within said horizontal section at points on both sides of its intersection with said vertical section, and a pair of opposed jet pumps disposed within said horizontal section to one side of its point of intersection with said vertical section, said jet pump being connected to said control valve to selectively receive high pressure reactor coolant from said control valve and selectively discharge said coolant along the axis of said horizontal section.

4. The reactor of claim 1 wherein said means for detecting excessive power to coolant flow conditions in the core by the onset of a critical heat flux condition in said sensors comprises:
   (a) a sensor fuel element comprising fuel material sandwiched between thin and thick claddings, the thin cladding being cooled by reactor coolant passing through said reactor core;
   (b) means for passing a separate stream of reactor coolant through said sensor fuel element to cool said thick cladding; and
   (c) a signal converter in fluid communication with the separate stream of reactor coolant passing through said sensor fuel element to cool said thick cladding; said signal converter being in fluid communication with said means for balancing the pressure of said first and second water volumes at said lower interface.

5. The reactor of claim 1 wherein said means for detecting excessive power to coolant flowrate conditions in the reactor core by the onset of a critical heat flux condition in sensors containing fuel comprises a sensor fuel pin comprising fuel material having a thin outer cladding and a thick inner cladding, said outer and inner cladding being cooled by reactor coolant passing through said reactor core; and a power line passing along the axis of said sensor fuel pin, said power line providing power to said means for balancing the pressure of said first and second water volumes at said lower interface.

6. The reactor of claim 5 wherein said means for balancing the pressure of said first and second water volumes comprises a vortex fluidic valve having a tangential inlet for inducing vortex flow within said valve a central low pressure discharge port and a peripheral high pressure discharge port;

means powered through said power line for supplying a stream of high pressure reactor coolant to said tangential inlet, a plenum in fluid communication with said discharge port and said lower interface whereby the pressure in said plenum balances the pressure of said first volume of water at said interface.

* * * * *